Feb. 13, 1968         J. W. BELL         3,368,288
CONDENSATE SYPHON PIPE FOR DRYING DRUM
Filed Feb. 11, 1966                  2 Sheets-Sheet 1

INVENTOR
JACK W. BELL
BY Cushman, Darby, Cushman
ATTORNEYS

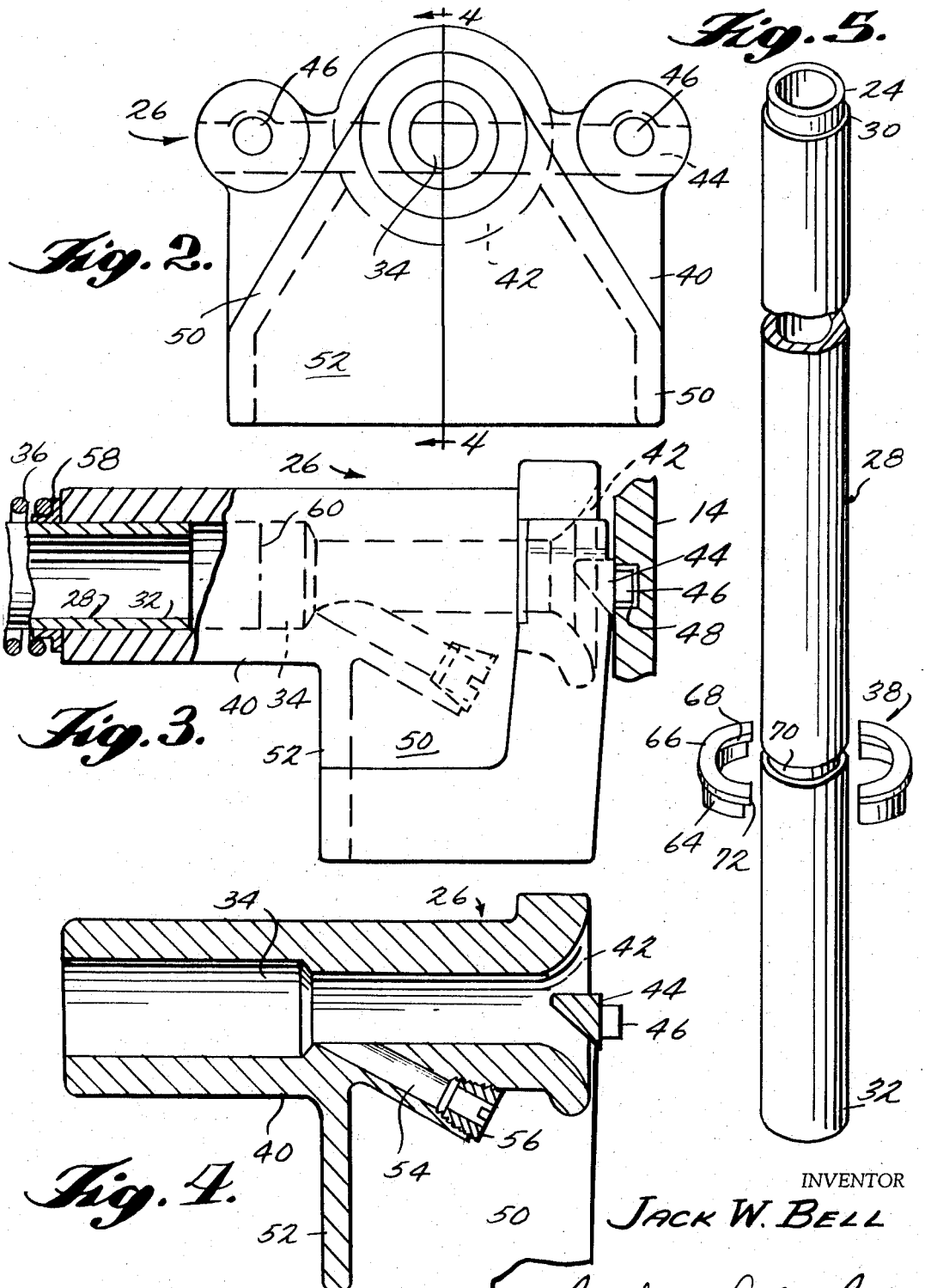

United States Patent Office 3,368,288
Patented Feb. 13, 1968

3,368,288
CONDENSATE SYPHON PIPE FOR DRYING DRUM
Jack W. Bell, 525 Russell Ave., Woodlawn Terrace,
Savannah, Ga. 31408
Filed Feb. 11, 1966, Ser. No. 526,814
7 Claims. (Cl. 34—125)

ABSTRACT OF THE DISCLOSURE

A rotatable steam heated drum is provided with a syphon pipe structure comprising a radially extending conduit having an inner end in communication with the interior of a hollow journal of the drum and an outer end mounted in a condensate pickup fitting. The pickup fitting has dowels which are received in sockets formed in the drum shell and a spring is provided between a split ring on the conduit and the pickup fitting to urge the fitting against the drum shell and the inner end of the conduit into a socket in the hollow journal thereby forming a structure which does not move relative to the drum shell and which is readily releasable.

This invention relates to a syphon pipe arrangement for a rotating steam heated drum and in particular to a spring-biased syphon pipe which is easily installed and which is not subject to movement relative to the drum at high rotational speeds of the latter.

Steam heated drums have long been used in the production of paper and in other operations where drying of strip or sheet material is carried out. The typical operation includes the passing of the sheet material over the periphery of one or more rotating hollow drums which are heated by injecting steam into their interiors. Since a substantial quantity of steam condenses during a drying operation it is conventional to provide each drum with an internal syphon pipe arrangement which rotates with the drum and through which condensate may be withdrawn. Typically the drums are mounted on hollow journals, and the syphon pipe structures are connected to pass the condensate through the hollow journals. The conventional pipe structure comprises, broadly, a conduit disposed radially in the drum with its inner end in communication with the hollow journal and with its outer end provided with a condensate pickup fitting or shoe disposed immediately adjacent the inner periphery of the drum.

The installation and removal of a syphon pipe structure is a time-consuming operation and it has been suggested in the past that a simpler more efficient arrangement would result if the pipe structure was held in place by the action of a compression spring which urged one or both ends of the pipe structure against the drum shell. The frictional engagement thus provided between the pipe structure and the drum shell was considered sufficient to prevent movement of the pipe structure during rotation. However, it has been observed that the forces created by the high drum speeds currently being employed, for example 2000 ft. per minute at the periphery, tends to overcome the friction between a spring-mounted pickup shoe and the drum shell thus permitting relative movement between the two. Accordingly, spring-mounted syphon pipe structures have not been widely used in high speed drums, and it has been the practice to secure the shoe to the drum shell with bolts screwed into tapped holes in the shell. While this procedure prevents relative movement between the shoe and the drum shell, it does not make for efficient installation because of the necessity for tapping the bolt holes and subsequent screwing in of the bolts. Also, it hinders efficient removal because of corrosion which may cause the bolts to bind and wring off thus necessitating the drilling and tapping of new bolt holes.

It is the primary object of the present invention to provide an improved syphon pipe structure which is more easily installed and removed in a hollow heating drum than prior pipe structures and which at the same time is not subject to movement relative to the drum shell during rotation of the latter.

It is a more specific object to provide a syphon pipe structure having an improved spring-biasing arrangement for holding the pickup shoe against the drum shell, the arrangement including a readily releasable compression spring which urges the shoe against the drum shell and one or more dowels or the like extending radially from the shoe into unthreaded sockets formed in the drum shell. In the preferred arrangement the pipe structure includes a straight length of conduit having one end fitting into a socket attached to the hollow drum journal and its other end fitting into a socket in the pickup shoe, the conduit being longitudinally slidable while engaged in both sockets. A compression spring surrounds the conduit and is maintained under compression between the pickup shoe and a removable spring retainer carried by the conduit. The shoe is forced radially outwardly thereby retaining the dowels in the sockets in the drum shell. Preferably the spring retainer is of the split ring or collar type which may be removed after first compressing the spring with a suitable tool. When the retainer has been removed, the spring is released and the pipe structure may then be removed by sliding the conduit radially outwardly into the socket in the pickup shoe so as to free the inner end of the pipe from the socket at the hollow drum journal. The same general advantage may be had with an arrangement in which one or both of the sockets are formed by the ends of the conduit.

The invention will be further understood from the following detailed description taken with the drawings in which:

FIGURE 2 is a top plan view of the condensate pickup shoe of the syphon pipe structure of FIGURE 1;

FIGURE 3 is a fragmentary view, partly broken away, of the condensate pickup end of the pipe structure;

FIGURE 4 is a sectional view taken on the line 4—4 of FIGURE 2; and

FIGURE 5 is a perspective view of the conduit portion of the syphon pipe structure of FIGURE 1.

Figure 1:
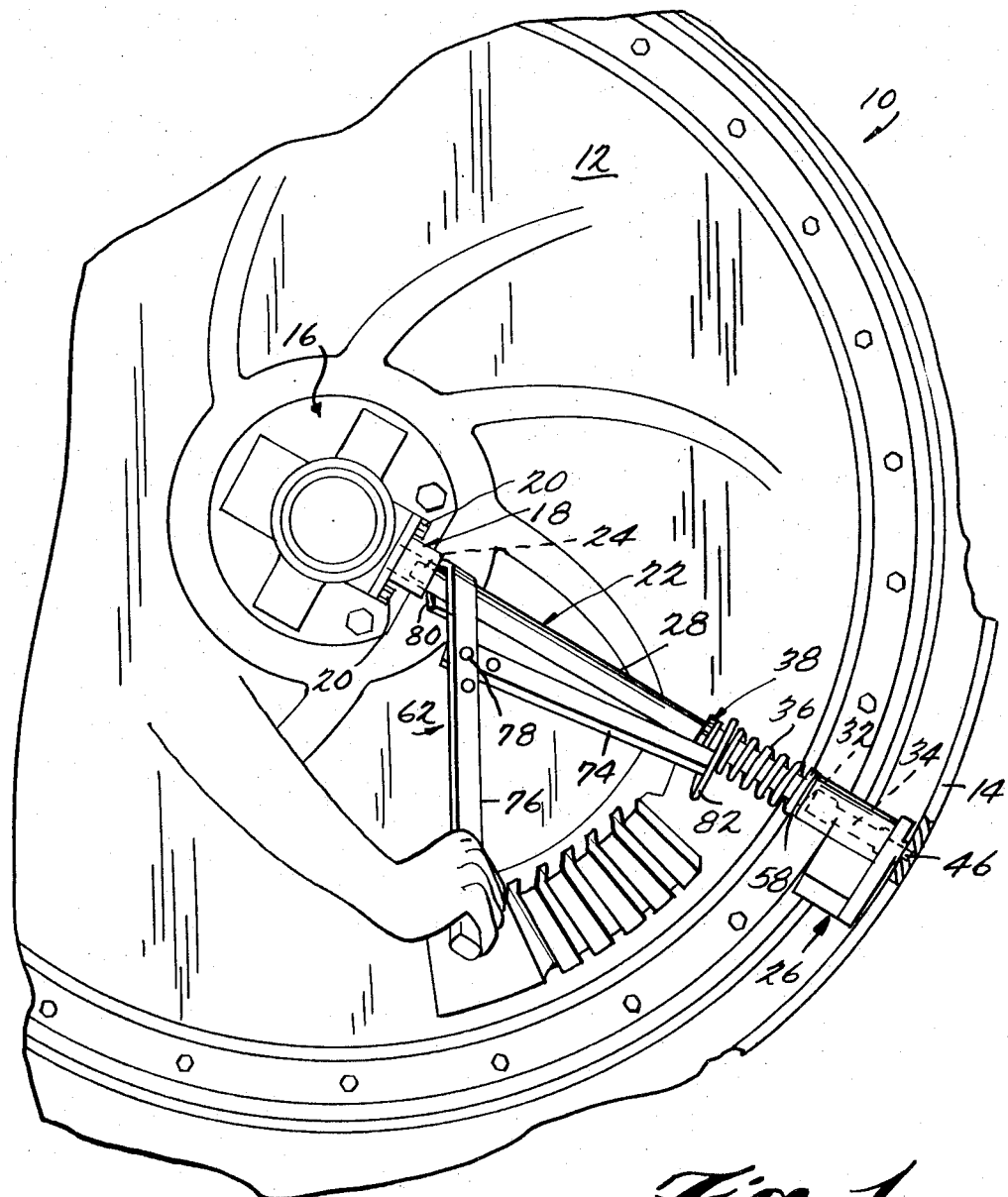
FIGURE 1 is a perspective view of the interior of a hollow drum showing the syphon pipe of the present invention and illustrating the manner of compressing the spring during installation or removal of the pipe structure.

Referring to FIGURE 1 there is shown in perspective view the interior of a steam-heated paper drying drum 10 having a circular end wall 12, a cylindrical shell 14 and a journal 16 which mounts the drum for rotation about a vertical axis. The journal 16, as is conventional, is of hollow construction and in the present arrangement includes a radially outwardly facing flanged collar 18 which is bolted to the exterior of the journal 16 at 20 and which communicates with the bore of the journal 16. A syphon pipe structure 22, constructed according to the principles of the present invention, is disposed between the collar 18 and the inner surface of the drum shell 14, the inner end 24 of the pipe structure 22 being slidably inserted into the collar 18.

The syphon pipe structure 22 includes a hollow condensate pickup shoe 26 lying against the inner surface of the drum shell 14 and a straight length of condensate removal conduit 28 extending radially from the shoe 26 to the collar 18, the latter defining a socket into which the inner end 24 of the conduit 28 projects with a hand tight fit. The end 24, which is of lesser diameter than the remainder of the conduit, is defined by a radially inwardly facing shoulder 30 (FIGURE 5) which engages the end of the collar 18 thereby limiting the extent to which the conduit 28 may slide into the collar 18. The outer end of the conduit 28 slidably fits in a bore 34 in the pickup shoe 26. In the installed position of the pipe structure 22, as shown in FIGURE 1, a spiral spring 36 carried on the conduit 28 in compression between a spring retainer 38 and the pickup shoe 26 urges the shoe 26 into tight engagement with the inner surface of the drum shell 14.

As best shown in FIGURES 2, 3 and 4, the pickup shoe 26 is constructed as a single cast body 40 having a condensate inlet end which in the installed position is disposed immediately adjacent the inner surface of the drum shell 14. A flared condensate inlet opening 42 in the inlet end faces radially outwardly and defines the outer end of the bore 34. The body 40 is maintained slightly spaced from the shell 14 by a narrow rib 44 which extends across the inlet end of the shoe 26 and which projects beyond the inlet opening 42. Lateral or turning movement of the shoe 26 relative to the drum shell 14 is prevented by dowels 46 which extend from the inlet end of the shoe 26 into sockets 48 which have been drilled in the inner surface of the drum shell 14. While FIGURE 3 shows a substantial clearance betwen the dowel 46 and the socket 48 for the purpose of clarity, in practice the dowels 46 will fit rather tightly in order to prevent vibration of the shoe 26. In the particular embodiment illustrated two dowels 46 are employed, one on either side of the inlet opening 42 near the periphery of the body 40. As shown, the dowels 46 are carried in holes drilled in the body 40 in which they are retained by a tight fit. It has been found that the dowels 46 provide sufficient holding force if they extend about $3/16$ inch or more beyond the rib 44.

The pickup shoe 26 also includes an open box-like cavity defined by a pair of angled side walls 50 and a top wall 52. The cavity communicates with the bore 34 through a passage 54 which is drilled in the body 40. The outer end of the passage 54 which is drilled in the body 40. The outer end of the passage 54 is threaded and retains a slotted pipe nipple 56.

The syphon pipe structure 22 is assembled and installed in the drum 10 by first placing the pickup shoe 26 against the inner surface of the drum shell 14 so that the dowels 46 enter the sockets 48 in the shell 14. Then the spring 36 is placed over the conduit 28, and the outer end 32 of the latter is inserted into the bore 34 of the shoe 26 as shown in FIGURE 3. Preferably, the spring 36 is retained on the conduit 28 during this assembly step by means of a guide 58. As shown, the guide 58 is a flanged collar which fits the outside of the conduit 28 with sufficient tightness to prevent it and the spring 36 from sliding off the end 32 of the conduit 28. The outer end 32 of the conduit 28 is manually moved into the bore 34 of the shoe 26 a sufficient distance, illustrated at 60 in FIGURE 3, to permit the inner end 24 to be aligned with the collar 18, and then the conduit is moved radially inwardly to insert the end 24 into the collar 18. The spring 36 is then compressed, as with a tool 62, following which the spring retainer 38 is inserted to hold the spring 36 in compression. When the tool 62 is removed, the action of the spring forces the conduit 28 into the collar 18 until the shoulder 30 engages the latter, while at the same time the shoe 26 is forced against the inner surface of the drum shell 14.

Removal of the pipe structure 22 from the drum 10 is accomplished by the reverse of the above-described procedure. That is, the spring 36 is compressed and the retainer 38 removed following which the conduit 28 may be removed by sliding it further into the bore 34 to release the upper end 30 from the collar 18.

The spring retainer 38, as shown in FIGURE 5, consists of a split collar which includes a tubular portion 64 and an annular flange 66. The flange has an inside diameter of smaller dimension than the tubular part 64 and thereby defines a shoulder 68 which fits into an annular groove 70 in the exterior of the conduit 28. The outer portion of the flange 66 forms a shoulder 72 against which one end of the spring 36 bears when the assembly is installed in the drum 10.

Since the spring 36 is usually compressed by a force of about 150 pounds or greater it is desirable to employ a tool for the purpose. The tool 62 illustrated in FIGURE 1 is constructed of two arms 74 and 76 which are pivoted by means of a bolt 78 passing through one end of the arm 74 and through the arm 76 intermediate its ends. One end of the arm 76 is bent back on itself to form a U-shaped hook 80 which is adapted to engage the exterior of the conduit 28. The other end of the arm 76 serves as a handle for the operator. The free end of the other arm 74 is provided with a small flat plate 82 which has a generally U-shaped cutout (not shown) in one edge adapted to engage the conduit 28 between the coils of the spring 36. In use of the tool 62 the hook 80 is slipped over the conduit 28 near the inner end thereof, and the plate 82 is slipped between two of the upper coils of the spring 36. Downward pressure is then exerted on the outer end of the arm 76 by the operator so that it pivots about the point of engagement between the hook 80 and the collar 18. Simultaneously the other arm 74 moves downwardly so that the plate 82 compresses the spring 36 and displaces the upper end of the spring from the retaining groove 70 in the conduit 28. The halves of the spring retainer 38 may then be manually removed or inserted depending on whether the conduit 28 is being moved or installed.

It will thus be appreciated that the spring biasing arrangement together with the socket arrangement at each end of the conduit 28 and the dowel and socket arrangement at the outer end of the shoe 26 permit simple and rapid installation of the pipe structure 22 and at the same time positively fix the structure 22 against movement relative to the drum shell 14. The arrangement eliminates tapping of bolt holes in the shell 14 and effects a savings in maintenance time because there are no bolts to be screwed in and out with the attendant possibility of wringing off of one or more of the bolts.

The illustrated embodiment is exemplary of the principles of the present invention, and it is not intended that the details be limiting except as they appear in the appended claims.

What is claimed is:

1. A syphon pipe structure for removing condensate from the interior of a rotatable steam heated drum comprising: a straight rigid conduit; a hollow condensate pickup fitting having a condensate pickup end and a condensate discharge end, said pickup end having at least one condensate inlet opening; means defining a socket connection between said discharge end and one end of said conduit, said socket connection providing communication between the interior of said conduit and said condensate inlet opening and permitting longitudinal movement of said conduit; spacer means projecting from said pickup end beyond said condensate inlet opening for engagement with the inner periphery of a drum to space said pickup end therefrom; dowel means projecting from said pickup end beyond said spacer means for engagement with a socket in the inner periphery of the drum to thereby prevent displacement of said fitting; spiral spring means for urging said dowel means into said socket, said spiral spring means surrounding said canduit adjacent said one end thereof, one end of said spring means engaging said discharge end of said pickup fitting; and spring retainer means on said conduit for limiting longitudinal movement of said spring means toward the other end of said conduit.

2. Apparatus as in claim 1 wherein said spring retainer means includes a split collar one surface of which engages a shoulder on said conduit and another surface of which engages said spring means.

3. Apparatus as in claim 1 wherein said socket connection includes a socket in said discharge end of said fitting, said one end of said conduit slidably fitting in said socket.

4. In a condensate removal structure for use with a rotatable steam heated drum having a hollow journal and a peripheral shell, the improvement comprising: a radially extending condensate removal conduit in said drum, said conduit having an inner end adjacent the hollow journal and an outer end adjacent the peripheral shell; means defining a first socket connection between the inner end of said conduit and the hollow journal and permitting longitudinal movement of said conduit; a condensate pickup fitting having a condensate passage extending therethrough; means for positively restraining sliding movement of said condensate pickup fitting relative to said drum, said means including a socket in the inner periphery of the drum and a dowel projecting from said fitting and having an outer end portion extending into said socket; means defining a second socket connection between the outer end of said conduit and said condensate passage and permitting longitudinal movement of said conduit; and releasable spring biasing means urging said fitting radially outwardly against the peripheral shell of the drum and urging said conduit radially inwardly, said spring biasing means including a spiral spring surrounding said conduit and removable spring retaining means carried by said conduit, said spring being maintained in compression between said spring retaining means and said condensate pickup fitting, whereby after removal of said retaining means said conduit may be moved radially outwardly to disconnect its inner end from the hollow journal and then radially inwardly to disconnect its outer end from said fitting.

5. Apparatus as in claim 4 wherein said conduit has a shoulder thereon facing radially outwardly of the drum and wherein said spring retaining means includes a split collar held against said shoulder by said spring.

6. Apparatus as in claim 4 wherein said first socket connection movement includes a fitting fixed with respect to the hollow journal and defining a radially outwardly facing socket and wherein said inner end of said conduit is slidably fitted into said socket.

7. Apparatus as in claim 6 wherein said second socket connection includes a radially inwardly facing socket in said fitting and wherein said outer end of said conduit is slidably fitted into said socket.

References Cited

UNITED STATES PATENTS

| 49,366 | 8/1865 | Belfield | 285—31 |
| 267,666 | 11/1882 | Brigham | 34—125 |
| 1,412,056 | 4/1922 | Hughes et al. | 165—76 |
| 2,297,094 | 9/1942 | Armstrong et al. | 34—124 |
| 2,668,607 | 2/1954 | Stiles et al. | 287—127 X |
| 3,034,225 | 5/1962 | Hieronymus | 34—125 |
| 3,181,852 | 5/1965 | Paller | 85—51 |

FOREIGN PATENTS 546,088  8/1922  France.

JAMES W. WESTHAVER, *Primary Examiner.*

FREDERICK L. MATTESON, JR., *Examiner.*

A. D. HERRMANN, *Assistant Examiner.*